United States Patent
Larsen et al.

(10) Patent No.: US 6,655,712 B1
(45) Date of Patent: Dec. 2, 2003

(54) AIRBAG INFLATOR WITH ADAPTIVE FLOW ORIFICE

(75) Inventors: Alan R. Larsen, Layton, UT (US); Clark Rouesche, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/143,383

(22) Filed: May 10, 2002

(51) Int. Cl.[7] .............................................. B60R 21/26
(52) U.S. Cl. ................................................... 280/736
(58) Field of Search ............................. 280/736, 742, 280/741

(56) References Cited

U.S. PATENT DOCUMENTS

| | | | |
|---|---|---|---|
| 4,973,024 A | 11/1990 | Homma | 251/11 |
| 5,350,193 A | * 9/1994 | Murashima et al. | 280/741 |
| 5,433,476 A | 7/1995 | Materna et al. | 280/736 |
| 5,551,723 A | * 9/1996 | Mahon et al. | 280/737 |
| 5,906,394 A | * 5/1999 | Van Wynsberghe et al. | 280/737 |
| 6,062,598 A | 5/2000 | Faigle | 280/736 |
| 6,065,773 A | 5/2000 | Klinger et al. | 280/736 |
| 6,103,030 A | 8/2000 | Taylor et al. | 149/46 |
| 6,158,769 A | 12/2000 | Swann et al. | 280/736 |
| 6,189,927 B1 | 2/2001 | Mossi et al. | 280/741 |
| 6,314,889 B1 | 11/2001 | Smith | 102/530 |

* cited by examiner

*Primary Examiner*—Charles T. Jordan
*Assistant Examiner*—Kimberly S. Smith
(74) *Attorney, Agent, or Firm*—Sally J. Brown; James D. Erickson

(57) ABSTRACT

An inflator device having a chamber wherein a pressure dependant gas generant reacts to produce inflation gas and at least one orifice allowing the gas to pass and inflate an airbag. The at least one orifice is defined at least in part by a shape memory alloy having an austenite finishing temperature ($T_f$). The at least one orifice has a first fluid flow through area ($A_1$) when at a temperature less than $T_f$ and a second fluid flow through area ($A_2$) when at a temperature greater than $T_f$. The second fluid flow through area ($A_2$) is less than the first fluid flow through area ($A_1$).

37 Claims, 2 Drawing Sheets

AIRBAG INFLATOR WITH ADAPTIVE FLOW ORIFICE

BACKGROUND OF THE INVENTION

This invention relates generally to inflators such as for use in inflating inflatable restraint airbag cushions to provide impact protection to occupants of motor vehicles. More particularly, the invention relates to inflators which rely primarily on reaction of a combustible material for the production of an inflation gas and such as may provide a gas flow orifice for adaptive inflation gas output.

It is well known to protect a vehicle occupant using a cushion or bag, e.g., an "airbag," that is inflated or expanded with gas when the vehicle encounters sudden deceleration, such as in the event of a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as an "inflator."

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

In general, the burn rate for a gas generant composition can be represented by the equation (1), below:

$$r_b = k(P)^n \tag{1}$$

where, $r_b$=burn rate (linear)
k=constant
P=pressure
n=pressure exponent, where the pressure exponent is the slope of a linear regression line drawn through a log-log plot of burn rate versus pressure.

As will be appreciated, the pressure exponent generally corresponds to the performance sensitivity of a respective gas generant material, with lower burn rate pressure exponents corresponding to gas generant materials which desirably exhibit corresponding lesser or reduced pressure sensitivity.

Typical pyrotechnic-based inflator devices commonly include or incorporate certain component parts including, for example: a pressure vessel wherein the pyrotechnic gas generating material is burned; various filter or inflation medium treatment devices to properly condition the inflation medium prior to passage into the associated airbag cushion; and a diffuser to assist in the proper directing of the inflation medium into the associated airbag cushion.

To date, sodium azide has been a commonly accepted and used gas generating material. While the use of sodium azide and certain other azide-based gas generant materials meets current industry specifications, guidelines and standards, such use may involve or raise potential concerns such as involving handling, supply and disposal of such materials. Further, economic and design considerations have also resulted in a need and desire for alternatives to azide-based pyrotechnics and related gas generant materials. For example, interest in minimizing or at least reducing overall space requirements for inflatable restraint systems and particularly such requirements related to the inflator component of such systems has stimulated a quest for gas generant materials which provide relatively higher gas yields per unit volume as compared to typical or usual azide-based gas generants. Still further, automotive and airbag industry competition has generally lead to a desire for gas generant compositions which satisfy one or more conditions such as being composed of or utilizing less costly ingredients or materials and being amenable to processing via more efficient or less costly gas generant processing techniques.

As a result, the development and use of other suitable gas generant materials has been pursued. Through such efforts, various azide-free pyrotechnics have been developed for use in such inflator device applications including at least some which have or exhibit a relatively high burn rate pressure dependency, e.g., have a burn rate pressure exponent of 0.4 or more, at 1000 psi.

Typical pyrotechnic-based inflators involve the reaction of a gas generant to form an inflation gas which is released from the inflator device to effect the desired inflation of an associated airbag cushion. The rate at which inflation gas is produced or formed in an inflator is typically a significant factor in the rate at which an associated airbag cushion is inflated. While a rapid or high inflation rate is generally required in order to achieve inflation and deployment of an associated airbag cushion in order to provide desired vehicle occupant protection, efforts have been directed to reduce the mass flow rate of inflation gases into the airbag cushion during the initial stages of deployment such as to minimize or avoid the risk of injury to a vehicle occupant who are out of the desired traveling position (with such vehicle occupants often referred to as "out of position occupants").

Airbag installations providing a slower initial deployment rate, also referred to as low onset inflation, followed by an increased deployment rate can have the benefit of providing a more gradual initial deployment of the associated airbag cushion into the occupant-containing vehicle compartment yet still achieve desired full or complete inflation within the desired time frame. Current low onset inflation is generally best achieved via two-stage inflator devices. However, two-stage inflators commonly require two electrical initiators and are generally more expensive than single stage inflator devices.

Methods of obtaining low onset inflation via single stage inflators have generally not provided the desired deployment rate curve. Such single-stage inflator methods include: inhibiting the surface of the gas generant such as by coating or otherwise covering a surface portion or side of a gas generant tablet; initially cooling the inflation gasses in a heat sink that saturates quickly, wherein the saturated heat sink will no longer cool the gasses resulting in an increased pressure; methods for altering generant grain shape; and other methods that alter the ignition conditions to provide a non-synchronous ignition of all gas generant material.

In view of the above, there is a need and a demand for improved arrangements and methods for providing low onset inflation of airbag cushions, particularly with single stage inflator devices such as employ only a single electrical initiator. Further, there is a need and a demand for combustible material-based inflator devices which provide or result in a slower initial rate of deployment followed by an increase in deployment rate. Further, there is a need and a demand for such an inflator device which more freely permits the use of azide-free pyrotechnics, such as those which have or exhibit a relatively high burn rate pressure dependency. Still further, there is a need and a demand for such a low onset inflator device that is less costly to manufacture or produce. Yet still further, there is a need and a demand for single stage inflator devices that provide or result in low onset inflation without requiring the inclusion of complex or costly control devices or arrangements.

SUMMARY OF THE INVENTION

A general object of the invention is to provide an improved inflator and associated or corresponding methods of supplying inflation gas.

A more specific objective of the invention is to overcome one or more of the problems described above.

The general object of the invention can be attained, at least in part, through an improved inflator device having at least one orifice wherethrough inflation gas can pass. In accordance with one preferred embodiment of the invention, the at least one orifice is at least in part defined by a shape memory alloy material having an austenite finishing temperature ($T_f$), wherein the at least one orifice defines a first fluid flow through area ($A_1$) when at a temperature less than $T_f$ and a second fluid flow through area ($A_2$) when at a temperature greater than $T_f$, where $A_2<A_1$.

As described in greater detail below, shape memory alloys in accordance with the invention can be initially formed into a first shape and subsequently deformed or stressed into a second shape while in a martensite phase. When heated to a temperature where the shape memory alloy forms the austenite phase, referred to as the austenite finishing temperature ($T_f$), the shape memory alloy generally returns to the prestressed or unmodified martensite shape.

In accordance with a preferred practice of the invention, adaptability in inflator output is achieved through change in cross sectional area of the orifice such as to result in a change in combustion pressure. In particular, practice of the invention in conjunction with a gas generant material, e.g., pyrotechnic, having a burn rate which is pressure dependant as herein defined, results in changes in combustion pressure correspondingly changing the burn rate of the gas generant, thus altering or adapting the inflator output, e.g., inflation gas mass flow rate. For example, reducing the inflator orifice area raises the combustion pressure within the gas production chamber which, in turn, raises the burn rate of the gas generant material which increases the inflation gas mass flow rate from the inflator. Correspondingly, increasing the inflator orifice area reduces the combustion pressure within the gas production chamber which, in turn, reduces the burn rate of the gas generant material which decreases the inflation gas mass flow rate from the inflator. Such performance behavior is opposite to that of at least certain prior art inflator devices such as certain stored gas inflators which incorporate an adjustable exit area. In particular, such prior art inflator devices typically experience a reduction in inflation gas mass flow rate with a reduction in exit area and an increase in inflation gas mass flow rate with an increase in exit area.

The prior art generally fails to provide inflator devices with low onset inflation that are of as simple a design and construction as may be desired. In particular, the prior art fails to provide such a low onset inflator device which relies largely or primarily on the reaction of a combustible material, e.g., a pyrotechnic, especially such as various azide-free pyrotechnics which have or exhibit a relatively high burn rate pressure dependency, to form or produce inflation gas. Further, the prior art generally fails to provide adaptive performance inflatable restraint assembly combinations which incorporate shape memory alloy technology to change or alter the internal pressure of the combustion chamber thereby increasing gas mass flow rate as the gas generant reacts.

The invention further comprehends an airbag inflator device with a first chamber wherein a supply of a combustible gas generant material reacts to produce gas and an orifice assembly in fluid communication with the first chamber. The orifice assembly defines at least one orifice wherethrough at least a portion of the produced gas can pass. The orifice assembly includes at least one inflator device opening and a restrictor disposed adjacent the at least one opening. The restrictor device is at least in part defined by a shape memory alloy material with an austenite finishing temperature ($T_f$). The at least one orifice defines a first fluid flow through area ($A_1$) when at a temperature less than $T_f$ and a second fluid flow through area ($A_2$) when at a temperature greater than $T_f$. The second fluid flow through area ($A_2$) is less than the first fluid flow through area ($A_1$) allowing for adaptability in inflator output.

The invention still further comprehends a self-regulating inflation gas rate flow inflator device with a first chamber for burning a supply of a combustible gas generant material having a burn rate which is pressure dependent to form a product gas and at least one orifice wherethrough at least a portion of the product gas can pass. The at least one orifice is preferably at least in part defined by a shape memory alloy material comprising a ternary alloy including copper, aluminum and one of nickel and bromine. The shape memory alloy has an austenite finishing temperature ($T_f$) of at least 90° C. and the at least one orifice defines a first fluid flow through area ($A_1$) when at a temperature less than $T_f$ and a second fluid flow through area ($A_2$) when at a temperature greater than $T_f$. The second fluid flow through area ($A_2$) is less than the first fluid flow through area ($A_1$) allowing for adaptability in inflator output.

As used herein, references to a "shape memory alloy" are to be understood to refer to metal alloys characterized by the ability to be quickly restored to a prestressed shape at a predetermined temperature that causes a change from a martensite phase to an austenite phase. Shape memory alloys can be formed into a first shape and then stressed into a second shape while in the martensite phase. Upon heating the alloy material to the austenite phase, the alloy is suitably returned to the prestressed martensite shape.

As used herein, references to "austenite finishing temperature" generally refer to the temperature at which the martensite to austenite reaction is completed upon heating.

As used herein, references to "self-regulating" inflation gas flow inflator devices are to be understood to generally refer to those inflator devices which require no external sensors or other control equipment to adjust the gas flow from the inflator device to an associated airbag cushion. Correspondingly, the "self-regulating" function of shape memory alloys in accordance with a preferred embodiment of the invention is dependant on predetermined temperatures and therefore desirably requires no additional sensors or control equipment.

Further, references herein to a combustible gas generant material, e.g., a pyrotechnic, having a burn rate which is "pressure dependent" are to be understood to refer to those combustible gas generant materials having a relatively high burn rate pressure dependency. In the context of the invention, such a relatively high burn rate pressure dependency is generally signified by a burn rate pressure exponent of at least about 0.4 at 1000 psi, preferably by a burn rate pressure exponent in the range of about 0.4 to about 0.6, at 1000 psi.

Other objects and advantages will be apparent to those skilled in the art from the following detailed description taken in conjunction with the appended claims and drawings.

DETAILED DESCRIPTION OF THE INVENTION

Figure 1:
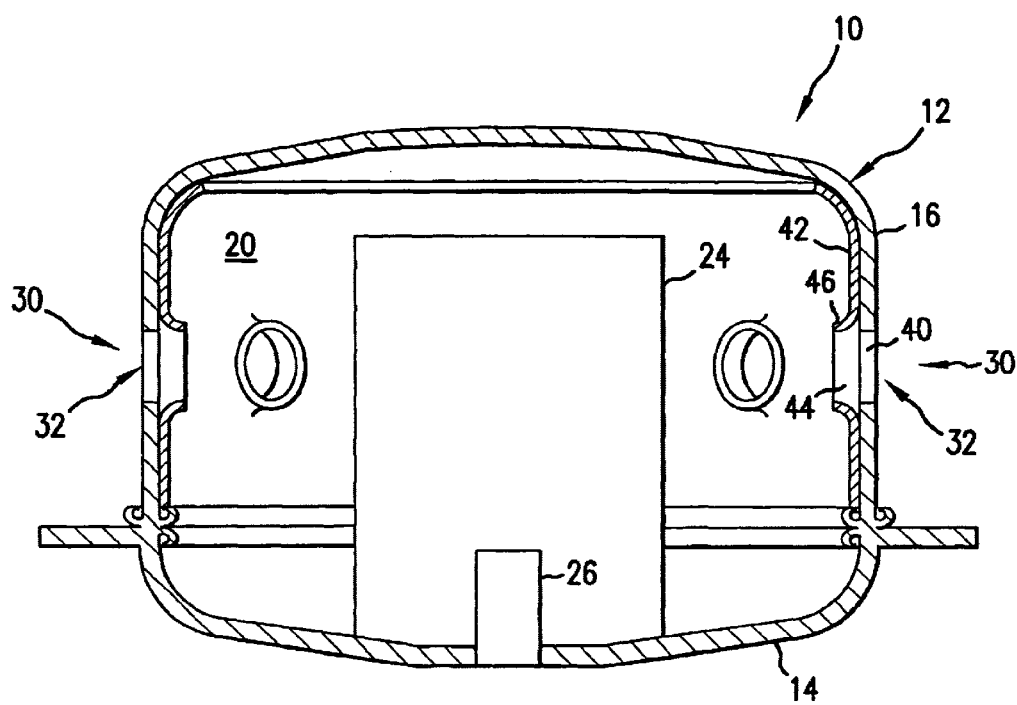
FIG. 1 is a simplified, schematic drawing of an inflator in accordance with one preferred embodiment of the invention, shown partially in section.

The present invention provides an improved airbag inflator device having an orifice with a fluid flow through area adaptable at a predetermined temperature resulting in an increase in gas flow therethrough and such as to an associated airbag, for example. FIG. 1 illustrates an inflator device, generally designated with the reference numeral 10, in accordance with one preferred embodiment of the invention. While FIG. 1 represents a simplified driver side airbag inflatable restraint system installation, it will be understood that the invention has general applicability to other types or kinds of inflatable restraint system installations including other types or kinds of airbag inflatable restraint system installations including, for example, passenger side, and side impact airbag assemblies such as for automotive vehicles including vans, pick-up trucks, and particularly automobiles. The inflator device of FIG. 1 is simplified to facilitate illustration and understanding and does not show various inflator device internals such as including filters or the like. As will be appreciated, such inflator device internals are generally well known in the art and do not generally form limitations on the broader practice of the invention.

As shown in FIG. 1, the inflator device 10 has a generally cylindrical external outline and includes a housing assembly 12 formed of two structural components, i.e., a lower shell or base portion 14 and an upper shell or diffuser cap portion 16, such as may be desirably fabricated of steel and appropriately joined or fastened together such as via application of an appropriate welding operation. The housing assembly 12 at least in part defines a chamber 20 (sometimes referred to as a combustion chamber). A combustible gas generant material, schematically shown and designated by the reference numeral 24, is located within the chamber 20 of the inflator device 10. The combustible gas generant material 24 is ignited by an ignition device, schematically shown and designated by the reference numeral 26. Upon ignition, the gas generant material 24 reacts within the chamber 20 to produce an inflation gas for inflating an associated airbag cushion (not shown).

The gas generant material 24 and ignition device 26 are schematically represented in FIG. 1 to facilitate illustration and comprehension of the invention. Those skilled in the art and guided by the teachings herein provided will appreciate that various forms or types of gas generant materials and ignition devices can desirably be used in the practice of the invention and the broader practice of the invention is not necessarily limited to specific forms or types of gas generant materials and ignition devices.

According to one embodiment of the invention, at least upon actuation of the inflator device 10, the contents of the chamber 20 are in fluid communication with at least one and preferably a plurality of orifice assemblies 30. Each of the orifice assemblies 30 defines at least one orifice 32 through which at least a portion of the produced gas can pass. As shown and in accordance with one preferred embodiment of the invention, the inflator device 10 includes a plurality of orifices 32 wherethrough inflation gas can pass. In this illustrated embodiment, the gas passing through the orifices exits the inflator device 10 such as to inflate an associated airbag cushion (not shown). Consequently such orifice assemblies and orifices are sometimes referred to as "external" orifice assemblies and "external" orifices, respectively.

While the invention can desirably be practiced employing orifices 32 which have a generally circular cross section, those skilled in the art and guided by the teachings herein will appreciate that the invention can be practiced employing orifice assemblies, and orifices, in various numbers, sizes, shapes, and layouts, as may be desired for particular installations.

In one embodiment of this invention, the combustible gas generant material 24 has a burn rate which is pressure dependent. In general, the burn rate for such gas generant material can be represented by the equation (1), below:

$$r_b = k(P)^n \qquad (1)$$

where, $r_b$ is the burn rate of the gas generant material, k is a constant, P is the combustion pressure, and n is the pressure exponent, where the pressure exponent is the slope of a linear regression line drawn through a log-log plot of burn rate versus pressure.

While the invention may, if desired, be practiced employing various gas generant materials, as are known in the art, the invention has particular perceived utility when used in conjunction with those gas generant materials, e.g., pyrotechnics, which have or exhibit a relatively high burn rate pressure dependency, e.g., have a burn rate pressure exponent of 0.4 or more, at 1000 psi, such as described above. Such gas generant materials include various newly developed azide-free pyrotechnics. The metal amine nitrate-containing azide-free gas generant compositions disclosed in U.S. Pat. application Ser. No. 09/221,910, filed Dec. 28, 1998, now U.S. Pat. No. 6,103,030, issued Aug. 15, 2000, and whose disclosure is fully incorporated herein, are examples of one preferred form of an azide-free gas generant composition having such a high burn rate pressure dependency for use in the practice of the invention. As disclosed in that U.S. Patent, one particularly preferred gas generant composition in accordance therewith includes: between about 35 and about 50 weight % of guanidine nitrate fuel, between about 30 and about 55 weight % copper diammine dinitrate oxidizer, between about 2 and about 10 weight % silicon dioxide burn rate enhancing and slag formation additive, and between about 0 and about 25 weight % ammonium nitrate supplemental oxidizer. As the burn rate of such pyrotechnic gas generant materials is a strong function of pressure, higher combustion pressures can produce or result in higher mass flow rates of produced or formed gases. Correspondingly, with such pyrotechnic gas generant materials, lower combustion pressures can produce or result in lower mass flow rates of produced or formed gases.

Those skilled in the art and guided by the teachings herein provided will appreciate that the incorporation and use of such high burn rate pressure dependency gas generant materials in the practice of the invention desirably allows or facilitates a more controlled or adaptive generation or production of inflation gas. Controlling the amount of gas generated by the gas generant, in turn, allows for desired control of the rate of deployment of an associated airbag cushion. As identified above, inflatable restraint installations which provide or result in a less rapid or less aggressive initial deployment followed by an increase in deployment rate are generally desired or sought such as to better provide for out of position occupants. The pressure dependency of the burn rate of the combustible gas generant material, in accordance with one preferred embodiment of the invention, is at least about 0.4 at 1000 psi.

In accordance with a preferred embodiment of the invention, the orifice 32 of the inflator device 10 is at least in part defined by a shape memory alloy material. Shape memory alloy materials employed in the practice of the invention desirably undergo phase transformations due to particular changes in temperature. These alloys are generally characterized by memory of a first configuration imposed upon the alloy while in a martensite phase at a relatively low temperature. The martensite phase of the shape memory alloy allows the shape memory alloy material to be relatively easily deformed into a second shape. Upon heating to a temperature at which the shape memory alloy undergoes a phase transformation from the martensite phase to the austenite phase, the memory effect of the shape memory alloy is manifested by a return to the undeformed shape of this shape memory alloy in the martensite phase. This effect is sometimes called "detwinning." The austenite phase change "resets" the modified martensite lattice structure to the unmodified martensite shape.

For example, the shape memory alloy material has an austenite finishing temperature ($T_f$). The orifice 32 defines a first fluid flow through area ($A_1$) when at a temperature less than $T_f$ and a second fluid flow through area ($A_2$) when at a temperature greater than $T_f$. The second fluid flow through area ($A_2$) is less than the first fluid flow through area ($A_1$).

In one embodiment of this invention, as shown in FIG. 1, the orifice 32 is at least in part defined by at least one exit opening 40 formed in the inflator device 10 and a restrictor 42. As shown in FIG. 1, the restrictor 42 can desirably be disposed adjacent an area of the inside of the inflator device 10. The restrictor 42 comprises an opening 44 in combination with the exit opening 40, thereby forming the orifice 32. One skilled in the art guided by the teachings herein provided will appreciate that the number of exit openings 40 and/or exit openings 40 in combination with restrictor openings 44 can be selected dependant on the requirements of the particular inflatable device installation.

The restrictor opening 44 can be formed in the restrictor 42 by punching the restrictor opening 44 having a second cross sectional area ($a_2$). The restrictor opening 44 having the second cross sectional area ($a_2$) is formed while the shape memory alloy of the restrictor 42 is in the martensite phase. In the martensite phase the restrictor opening 44 can be subsequently deformed by extrusion to widen the opening 44 to a cross sectional area ($a_1$). A heat treatment application may be desired or necessary to set the extrusion and preserve the memory effect.

Referring to FIG. 1, extrusion of the restrictor opening 44 results in a restrictor opening collar 46. The restrictor opening 44 maintains the cross sectional area ($a_1$) when the shape memory alloy material is at a temperature less than $T_f$ and when at a temperature greater than $T_f$, the restrictor opening 44 at least partially closes to an opening having the second cross sectional area ($a_2$). At a temperature greater than $T_f$, the undeformed martensite phase shape returns, e.g., the extruded martensite shape returns to the pre-extruded martensite shape. The shape memory alloy of restrictor opening 44 preferably returns to the pre-extruded martensite shape having the same cross sectional area as was originally formed, but it is desired that the post-extruded restrictor opening 44 at least have a cross sectional area less than the martensite restrictor opening 44 having the first cross sectional area ($a_1$). The shape memory alloy allows for a self-regulating inflation gas rate flow inflator device in that the shape memory alloy functions as a result of temperature and requires no additional outside control to close the orifice 32.

Figure 2:
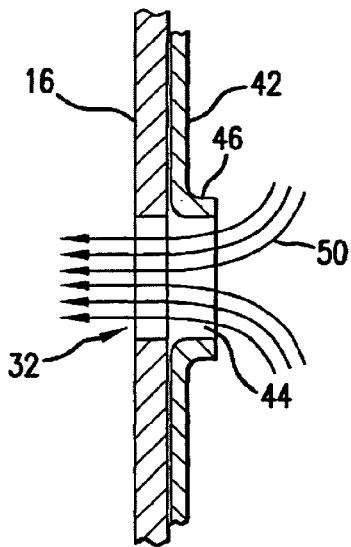
FIG. 2 is a simplified fragmentary cross-sectional, schematic drawing of an orifice of an inflator in accordance with one preferred embodiment of the invention.

In FIG. 2 the restrictor opening 44 of the restrictor 42 is aligned with the exit opening 40 forming the orifice 32. FIG. 2 shows the extruded restrictor opening 44 at a temperature less than $T_f$ wherein the restrictor opening 44 has the first cross sectional area ($a_1$) and orifice 32 has the first fluid flow through area ($A_1$). In FIG. 2 the exit opening 40, the first fluid flow through area ($A_1$), the restrictor opening 44, and the first cross sectional area ($a_1$) are all shown as equal in diameter, although the restrictor opening 44 and the first cross sectional area ($a_1$) can differ in size from the first fluid flow through area ($A_1$). Upon sudden vehicle deceleration, the ignition device 26 ignites the reaction of the gas generant 24, and gas begins flowing out through the orifice 32, as represented by the arrows 50 in FIG. 2. As the gas generant reacts the temperature within the inflator device rises to a temperature greater than $T_f$, resulting in the shape memory alloy of the restrictor 42 returning to its original martensite shape.

Figure 3:
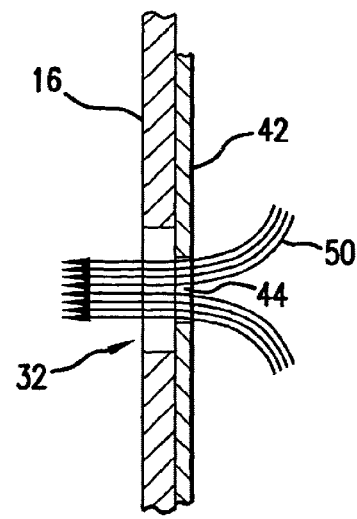
FIG. 3 is a simplified fragmentary cross-sectional, schematic drawing of an orifice of an inflator in accordance with one preferred embodiment of the invention.

FIG. 3 shows the restrictor opening 44 at a temperature greater than $T_f$. The extruded restrictor opening 44 has returned to its pre-extruded shape. The second cross sectional area ($a_2$) of the restrictor opening 44 results in the second fluid flow through area ($A_2$) of the orifice 32. The smaller second fluid flow through area ($A_2$) restricts gas flow and increases the pressure inside the chamber 20 as the generated gas (as represented by the arrows 50) has less area to escape. The increased pressure within the chamber 20 causes the pressure dependent gas generant 24 to react at an increased rate creating more gas and thereby increasing the gas mass flow rate out of the orifice 32 and increasing the rate of inflation of the associated airbag. The shape memory alloy restrictor allows for an adaptable airbag inflation rate, with a slower initial rate of inflation followed by an increased rate of inflation, while still inflating an airbag within a desired time frame.

Those skilled in the art and guided by the teachings herein provided will appreciate that various shape memory alloys such as known in the art can be used in the practice of this invention. One such shape memory alloy is an alloy containing nickel and titanium called nitinol (Nickel Titanium Naval Ordanance Laboratory) developed by the United States Navy.

Shape memory alloy materials used in the practice of the invention desirably have an austenite finishing temperature ($T_f$) of at least about 90° C. As will be appreciated, a general standard applied in the United States for automotive component parts is a capability to be stable at temperatures of at least 107° C. Thus, in accordance with certain preferred embodiments, shape memory alloy materials used in the practice of the invention desirably have an austenite finishing temperature ($T_f$) of greater than about 107° C.

In addition, shape memory alloys used in the practice of the invention desirably maintain stability and shape memory characteristics over extended periods of time (as inflatable restraint system installations within a particular vehicle may not be actuated for many years after installation, if at all).

In view of the above, shape memory alloys such those comprising a ternary alloy of copper, aluminum and nickel;

a ternary alloy of copper, aluminum and bromine; and a ternary alloy of iron, manganese and silicon, particularly those of such alloys having a desired austenite finishing temperature ($T_f$) of at least about 90° C. and, for at least certain preferred embodiments, an austenite finishing temperature ($T_f$) of greater than about 107° C., are generally currently preferred for use in the practice of the invention.

While the invention has been generally described above making reference to specific inflator device embodiments wherein one or more orifices in accordance with the invention are employed as an external orifice, e.g., an orifice wherethrough gas exits from an inflator device, it will be appreciated by those skilled in the art and guided by the teachings herein provided that the broader practice of the invention is not necessarily so limited. For example, if desired, inflator devices in accordance with the invention can advantageously employ orifice or orifice assembly constructions in accordance with the invention in a location internal to the inflator device.

Figure 4:
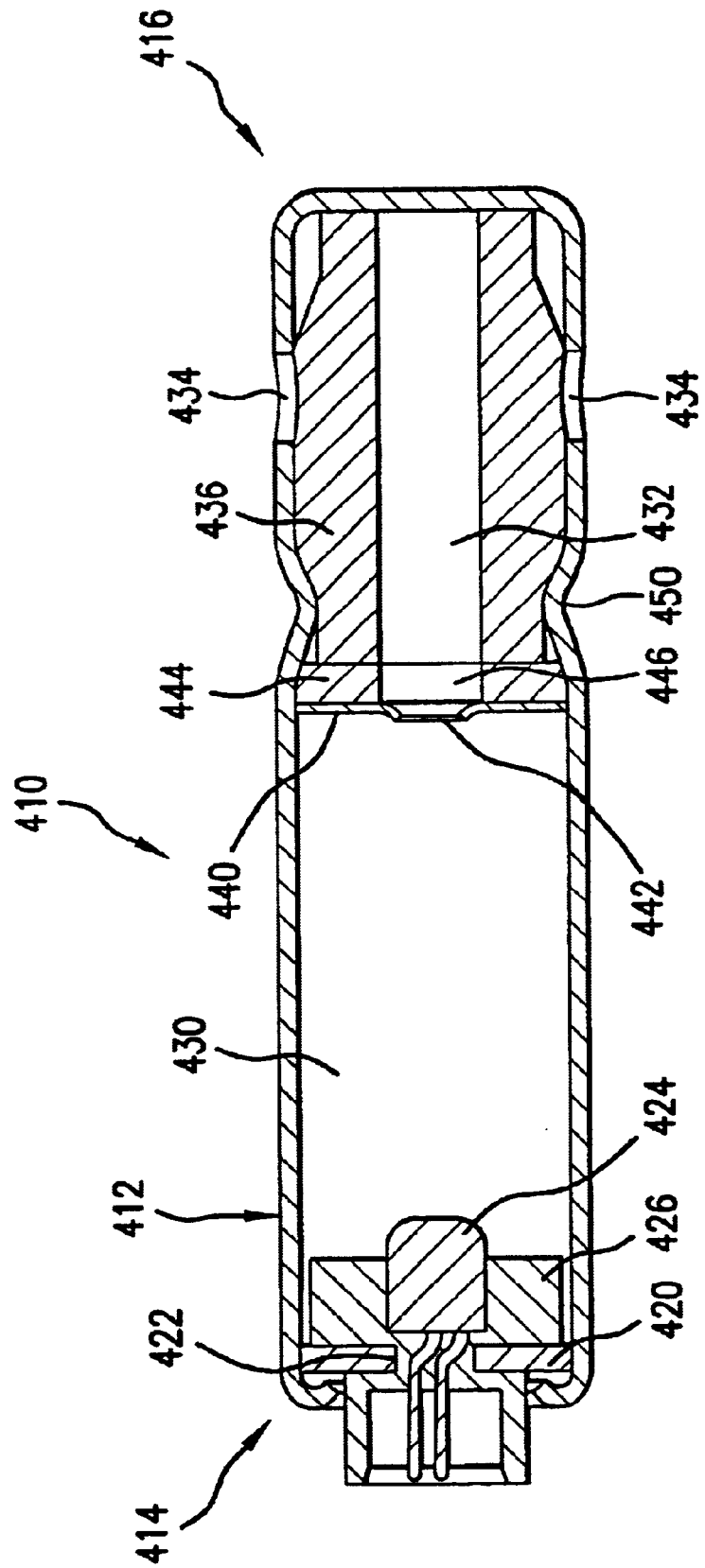
FIG. 4 is a simplified, schematic drawing of an inflator in accordance with another preferred embodiment of the invention, shown partially in section.

FIG. 4 is a simplified, schematic drawing of an inflator device assembly, generally designated by the reference numeral 410, in accordance with another preferred embodiment of the invention. In FIG. 4, the inflator device assembly 410 is shown partially in section. The inflator device assembly 410 includes a generally cylindrical housing 412 having an at least partially open first end 414 and a closed second end 416. The first end 414 is closed with a base 420, such as of steel. The base 420 includes an opening 422 wherethrough is passed an initiator device 424 such as with an associated adapter 426. Various initiator devices and adapters such as known in the art can be used and the broader practice of the invention is not limited to specific or particular such devices or elements.

The housing 412 forms a combustion chamber 430 and a diffusion chamber 432. The combustion chamber 430 houses or contains a supply of a combustible gas generant material, such as described above and not here shown to facilitate illustration. The diffusion chamber 432 has or includes one or more exit ports 434, such formed in the housing 412, wherethrough inflation gas can exit the inflator device 410 and pass directly or indirectly, as is known in the art, into an associated inflatable element (not shown). The diffusion chamber 432 also houses or contains a filter or inflation medium treatment assembly 436, such as known in the art and such as may be desired to condition or otherwise treat the inflation medium prior to passage out of the inflator device assembly 410. Examples of inflation medium treatment assemblies such as may be suitable for use in the practice of such an embodiment include filter elements made of knitted or woven metal wire.

In the illustrated embodiment, the combustion chamber 430 and the diffusion chamber 432 are generally axially aligned. The combustion chamber 430 and the diffusion chamber 432 are separated by a restrictor plate 440 such as includes an orifice 442, such as formed of or with a shape memory alloy, as described above. The inflator device assembly 410 may, as shown, also include a support disk 444, such as made of low carbon steel, and such as may be interposed between the restrictor plate 440 and the inflation medium treatment assembly 436. The support disk 444 includes an opening 446 generally aligned with the restrictor plate orifice 442. In accordance with a preferred embodiment of the invention, the support disk opening 446 is desirably designed to avoid being a flow restricting opening, e.g., the cross sectional area of the support disk opening 446 is desirably at least as great as the cross sectional area of the shape memory alloy restrictor plate orifice 442. As will be appreciated, through the assembly inclusion of such a support disk 444, the restrictor plate 440 can desirably be supported against the pressure exerted thereagainst such as by the combustion products gases formed upon reaction of the gas generant material housed or contained within the combustion chamber 430. In addition, the housing 412 may desirably be crimped, such as shown at 450, or otherwise shaped or formed such as to assist in maintaining desired or required orientation or positioning of the inflator assembly components, e.g., the desired orientation or positioning of the restrictor plate 440.

Thus, the inflator assembly 410 is an example of an inflator device, in accordance with the invention, which includes or contains an internal gas flow orifice in accordance with the invention.

Those skilled in the art and guided by the teachings herein provided will appreciate that the actuation time for a shape memory alloy material restrictor or the like orifice defining component can be desirably altered or tailored via various design parameters such as including bulk and thickness. Other approaches or procedures for suitably altering or tailoring the temperature-dependency of action by such shape memory alloy components include surface treatments such as anodizing or other methods to thermally isolate the component composed of the shape memory alloy material, e.g., the restrictor.

While the invention has been illustrated and described with reference to an embodiment wherein the inflator device housing assembly includes a restrictor made of the shape memory alloy material, the broader practice of the invention is not necessarily so limited as those skilled in the art and guided by the teachings herein provided will appreciate that in accordance with certain preferred embodiments the invention can, if desired, be practiced wherein the inflator housing assembly itself is at least in part composed of the shape memory alloy material.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an inflator device having at least one orifice wherethrough inflation gas can pass, an improvement comprising: the at least one orifice at least in part defined by a shape memory alloy material having an austenite finishing temperature ($T_f$), wherein the at least one orifice defines a first fluid flow through area ($A_1$) when at a temperature less than $T_f$ and a second fluid flow through area ($A_2$) when at a temperature greater than $T_f$, where $A_2 < A_1$.

2. The improvement of claim 1 wherein the inflator device comprises a plurality of orifices wherethrough inflation gas can pass and wherein at least several of the plurality of orifices are at least in part defined by the shape memory alloy material.

3. The improvement of claim 1 wherein the inflator device comprises a chamber wherein a supply of a combustible gas generant material is burned to produce the inflation gas.

4. The improvement of claim 3 wherein the combustible gas generant material has a burn rate which is pressure dependent.

5. The improvement of claim 4 wherein the pressure dependency of the burn rate of the combustible gas generant material, as represented by n in the burn rate expression:

$$r_b = k(P)^n$$

where, $r_b$ is the burn rate of the gas generant material, k is a constant, P is the combustion pressure, and n is the slope of a linear regression line drawn through a log-log plot of burn rate versus pressure, is at least about 0.4 at 1000 psi.

6. The improvement of claim 1 wherein the at least one orifice is additionally at least in part defined by at least one opening formed in the inflator device and wherein the shape memory alloy material forms a restrictor disposed adjacent the at least one opening.

7. The improvement of claim 6 wherein the restrictor comprises an opening aligned with the at least one orifice.

8. The improvement of claim 7 wherein the restrictor opening has a first cross sectional area ($a_1$) when the shape memory alloy material is at a temperature less than $T_f$ and a second cross sectional area ($a_2$) when the shape memory alloy is at a temperature greater than $T_f$.

9. The improvement of claim 8 wherein the shape memory alloy material of the restrictor is punched to form the restrictor opening having the second cross sectional area ($a_2$) and wherein the restrictor opening in the shape memory alloy material of the restrictor is subsequently extruded to have the first cross sectional area ($a_1$).

10. The improvement of claim 1 wherein the shape memory alloy material has an austenite finishing temperature ($T_f$) of at least 90° C.

11. The improvement of claim 10 wherein the shape memory alloy material comprises an alloy including nickel and titanium.

12. The improvement of claim 1 wherein the shape memory alloy material comprises a ternary alloy comprising copper, aluminum and nickel.

13. The improvement of claim 1 wherein the shape memory alloy material comprises a ternary alloy comprising copper, aluminum and bromine.

14. The improvement of claim 1 wherein the shape memory alloy material comprises a ternary alloy comprising iron, manganese and silicon.

15. The improvement of claim 1 wherein the shape memory alloy material has an austenite finishing temperature ($T_f$) of greater than 107° C.

16. The improvement of claim 1 wherein the at least one orifice comprises a circular shape.

17. The improvement of claim 1 wherein the at least one orifice is an orifice wherethrough inflation gas exits the inflator device.

18. The improvement of claim 1 wherein the at least one orifice is an orifice internally within the inflator device.

19. An airbag inflator device comprising:

a first chamber wherein a supply of a combustible gas generant material reacts to produce gas and an orifice assembly in fluid communication with the first chamber and defining at least one of orifice wherethrough at least a portion of the produced gas can pass, the orifice assembly comprising at least one inflator device opening and a restrictor disposed adjacent the at least one inflator device opening, the restrictor at least in part defined by a shape memory alloy material having an austenite finishing temperature ($T_f$) whereby the at least one orifice defines a first fluid flow through area ($A_1$) when at a temperature less than $T_f$ and a second fluid flow through area ($A_2$) when at a temperature greater than $T_f$, where $A_2 < A_1$.

20. The airbag inflator device of claim 19 wherein the inflator device comprises a plurality of orifices wherethrough inflation gas can pass and wherein at least several of the plurality of orifices are at least in part defined by the shape memory alloy material.

21. The airbag inflator device of claim 19 wherein the combustible gas generant material has a burn rate pressure dependency, represented by n in the burn rate expression:

$$r_b = k(P)^n$$

where, $r_b$ is the burn rate of the gas generant material, k is a constant, P is the combustion pressure, and n is the slope of a linear regression line drawn through a log-log plot of burn rate versus pressure, of at least about 0.4 at 1000 psi.

22. The airbag inflator device of claim 19 wherein the restrictor comprises an opening aligned with the at least one orifice.

23. The airbag inflator device of claim 22 wherein the restrictor opening has a first cross sectional area ($a_1$) when the shape memory alloy material is at a temperature less than $T_f$ and a second cross sectional area ($a_2$) when the shape memory alloy is at a temperature greater than $T_f$.

24. The airbag inflator device of claim 23 wherein the shape memory alloy material of the restrictor is punched to form the restrictor opening having the second cross sectional area ($a_2$) and wherein the restrictor opening in the shape memory alloy material of the restrictor is subsequently extruded to have the first cross sectional area ($a_1$).

25. The airbag inflator device of claim 19 wherein the shape memory alloy material has an austenite finishing temperature ($T_f$) of at least 90° C.

26. The airbag inflator device of claim 19 wherein the shape memory alloy material has an austenite finishing temperature ($T_f$) of greater than 107° C.

27. The improvement of claim 19 wherein the at least one orifice is an orifice wherethrough the produced gas exits the inflator device.

28. The improvement of claim 19 wherein the at least one orifice is an orifice internally within the inflator device and wherethrough the produced gas exits the first chamber.

29. A self-regulating inflation gas rate flow inflator device comprising:

a first chamber wherein a supply of a combustible gas generant material having a burn rate which is pressure dependent is burned to form a product gas and at least one orifice wherethrough at least a portion of the product gas can pass, the at least one orifice at least in part defined by a shape memory alloy material comprises a ternary alloy comprising copper, aluminum and one of nickel and bromine, the shape memory alloy having an austenite finishing temperature ($T_f$) of at least 90° C., wherein the at least one orifice defines a first fluid flow through area ($A_1$) when at a temperature less than $T_f$ and a second fluid flow through area ($A_2$) when at a temperature greater than $T_f$, where $A_2 < A_1$.

30. The device of claim 29 wherein the inflator device comprises a plurality of orifices wherethrough inflation gas can pass and wherein at least several of the plurality of orifices are at least in part defined by the shape memory alloy material.

31. The device of claim 29 wherein the pressure dependency of the burn rate of the combustible gas generant material, as represented by n in the burn rate expression:

$$r_b = k(P)^n$$

where, $r_b$ is the burn rate of the gas generant material, k is a constant, P is the combustion pressure, and n is the slope of a linear regression line drawn through a log-log plot of burn rate versus pressure, is at least about 0.4 at 1000 psi.

32. The device of claim 29 wherein the at least one orifice is additionally at least in part defined by at least one opening formed in the inflator device and wherein the shape memory alloy material forms a restrictor disposed adjacent the at least one opening.

33. The device of claim 32 wherein the restrictor comprises an opening aligned with the at least one orifice.

34. The device of claim 33 wherein the restrictor opening has a first cross sectional area ($a_1$) when the shape memory alloy material is at a temperature less than $T_f$ and a second cross sectional area ($a_2$) when the shape memory alloy is at a temperature greater than $T_f$.

35. The device of claim 34 wherein the shape memory alloy material of the restrictor is punched to form the restrictor opening having the second cross sectional area ($a_2$) and wherein the restrictor opening in the shape memory alloy material of the restrictor is subsequently extruded to have the first cross sectional area ($a_1$).

36. The improvement of claim 29 wherein the at least one orifice is an orifice wherethrough inflation gas exits the inflator device.

37. The improvement of claim 29 wherein the at least one orifice is an orifice internally within the inflator device.

* * * * *